(12) United States Patent
Khurgin et al.

(10) Patent No.: US 7,831,119 B2
(45) Date of Patent: *Nov. 9, 2010

(54) TUNABLE OPTICAL GROUP DELAY BASED ON MICRORESONATOR STRUCTURES

(75) Inventors: Jacob Khurgin, Baltimore, MD (US); Paul A. Morton, West Friendship, MD (US)

(73) Assignee: Morton Photonics, West Friendship, MD (US)

( * ) Notice: Subject to any disclaimer, the term of this patent is extended or adjusted under 35 U.S.C. 154(b) by 81 days.

This patent is subject to a terminal disclaimer.

(21) Appl. No.: 12/205,368

(22) Filed: Sep. 5, 2008

(65) Prior Publication Data

US 2009/0123107 A1 May 14, 2009

Related U.S. Application Data

(60) Provisional application No. 60/970,272, filed on Sep. 6, 2007.

(51) Int. Cl.
*G02B 6/26* (2006.01)
*G02B 6/42* (2006.01)

(52) U.S. Cl. .............................. 385/27; 385/32; 385/50
(58) Field of Classification Search .................. 385/27, 385/32

See application file for complete search history.

(56) References Cited

U.S. PATENT DOCUMENTS

2005/0117842 A1* 6/2005 Takahashi et al. ............. 385/27

* cited by examiner

*Primary Examiner*—Uyen-Chau N Le
*Assistant Examiner*—Chris H Chu
(74) *Attorney, Agent, or Firm*—Nadya Reingand

(57) ABSTRACT

This invention provides a tunable delay of an optical signal having multiple frequency components. The delay comprises at least a first and a second integrated resonators coupled sequentially to a waveguide; the resonators have angular resonant frequencies $\omega_1 = \omega_0 - \Delta\omega$ and $\omega_2 = \omega_0 + \Delta\omega$ respectively, $\omega_0$ is a median frequency of an input optical signal and $\Delta\omega$ is a tunable deviation from the median frequency. The device is providing a nearly equal true time delay to all frequency components in the output signal.

23 Claims, 6 Drawing Sheets

TUNABLE OPTICAL GROUP DELAY BASED ON MICRORESONATOR STRUCTURES

CROSS-REFERENCE TO RELATED APPLICATIONS

The application claims priority of U.S. Provisional Patent Application Ser. No. 60/970,272 filed Sep. 6, 2007.

STATEMENT REGARDING FEDERAL SPONSORED RESEARCH AND DEVELOPMENT

This invention was made with U.S. Government support under Contract W31P4Q-07-C0150 with DARPA MTO SBIR Project, and the U.S. Government has certain rights in the invention.

FIELD OF INVENTION

This invention relates to an active array antenna system for use in wireless communications. More particularly it addresses tunable delays to control phased array antennas.

BACKGROUND OF THE INVENTION

A phased array is a group of radio frequency antennas in which the relative phases of the respective signals feeding the antennas are varied in such a way that the effective radiation pattern of the array is reinforced in a desired direction and suppressed in undesired directions. In typical embodiments, they incorporate electronic phase shifters that provide a differential delay or phase shift to adjacent radiating elements to tilt the radiated phase front and thereby produce far-field beams in different directions depending on the differential phase shifts applied to the individual elements.

A number of embodiments of delay lines and antenna elements can be arranged in an RF antenna assembly. The antenna assembly may include an array of the antenna elements. Such arrays of the antenna elements may, in certain embodiments, be spatially arranged in either non-uniform or uniform pattern to provide the desired antenna assembly characteristics. The configuration of the arrays of the antenna elements may affect the shape, strength, operation, and other characteristics of the waveform received or transmitted by the antenna assembly.

The antenna elements may be configured to either generate or receive RF signal. The physical structure of the element for signal generation and reception is similar, and typically a single element is used for both functions. A phase shifter/true time delay (PS/TTD) device is a crucial part of the antenna element providing a differential delay or phase shift to adjacent elements to tilt the radiated/received phase front.

The active phased array antenna architecture is the most applicable to the use of the PS/TTD device. A schematic of one of the embodiments of an active phased array antenna unit is shown in FIG. 1. The antenna element is connected to a circulator, which is used to separate the high power transmit path and the low power receive path, providing the required isolation. The receive path includes a limiter to avoid damage from a high input level, followed by a low noise amplifier (LNA) used to bring the received signal up to the required power level. The output of the LNA passes through a transmit/receive switch, and then through the phase shifter/true time delay (PS/TTD) device, which provides the correct phasing for that element before the output is summed with that from all other elements. The PS/TTD provides the correct phase shifting of each antenna element at all frequencies. The overall phased array antenna output power is a coherent addition of the signals from each of the antenna elements. A large number of elements provide a large total power for the system.

The tunable delay application is not limited to active phased array antennas. Alternatively, PS/TTDs can be implemented in passive phased array systems, where the power is shared passively between many antenna elements, each having its own PS/TTD device.

Photonics technologies offer significant advantages over RF and microwave electronics, which can be exploited in phased array systems. Optics offer tremendous inherent bandwidth for use in optical processing and communicating systems, due to the very high carrier frequencies (e.g. 200 THz) compared to the microwave signals (10 s GHz) upon which they operate. Photonic technologies offer much lower cost if efficiently integrated. Photonic devices are inherently small due to the short wavelength at which they operate (around 1 micron) compared to the cm and mm wavelengths of microwave integrated circuits in phased array systems. Photonic integration provides a path to massive parallelism, providing additional reductions in size and weight, together with the promise of much lower overall system cost.

This invention relates to optical delay lines based on microresonator structures. One of the most promising delay line designs is a 'side-coupled integrated spaced sequence of resonators' (SCISSOR) shown in FIG. 2 (a). SCISSOR structures are by definition all-pass filters with light propagating in only one direction, and thus they have zero reflection. U.S. Pat. No. 7,058,258 discloses an implementation of the side—coupled sequence of resonators for tunable dispersion compensation. It provides different group delays at different frequencies of the optical signal. The present invention addresses an opposite goal—to achieve exactly the same group delay over as wide range of frequencies as possible.

Another configuration (FIG. 2 (b)) of the side-coupled sequence of resonators was presented in U.S. Pat. No. 7,162,120, where the resonators are coupled to the opposite sides of the core waveguide. This configuration was designed only for the device compactness; there is no difference between the resonators on the both sides of the waveguide.

A multitude of phased array systems are used in many applications, varying from large surveillance systems to weapons guidance systems to guided missiles, plus many civil applications including weather monitoring radar systems, radio-astronomy and topography.

There is a need to provide more reliable and efficient devices for tunable delays to control phased array antennas. The best approach is in implementation of an optical device to provide extended bandwidth, cost reduction and compactness.

SUMMARY OF INVENTION

This invention provides a tunable delay comprising at least a first and a second integrated microresonators having angular resonant frequencies $\omega_1=\omega_0-\Delta\omega$ and $\omega_2=\omega_0+\Delta\omega$ respectively, $\omega_0$ is a median frequency of an input optical signal and $\Delta\omega$ is a deviation from the median frequency. The resonators are coupled to a waveguide. In one embodiment the resonators are ring resonators having a radius ranging from about 2 µm to about 50 µm.

In the preferred embodiment an input signal is a complex signal having multiple frequency components, and the device is providing an equal group delay to all frequency components in the output signal. Such arrangement allows eliminating a third order group delay dispersion over all frequencies of the input optical signal; this is achieved using cancellation of a positive dispersion of the first loop resonator by a negative dispersion of equal magnitude of the second loop resonator.

The different resonant angular frequencies $\omega_1$ and $\omega_2$ may be achieved by different perimeters of the first and second resonators or by different effective refractive indices of the resonator waveguides. The resonator loop can be of any shape: ring, rectangular, etc.

The optical device of the present invention may provide a group delay up to 1000 ps. In order to achieve such delay the optical device includes more than one pair of microresonators with $\omega_1$ and $\omega_2$ frequencies; in the preferred embodiment the optical device has two sets of resonators, each set having at least 20 resonators. The first set has the angular resonant frequencies $\omega_1$ and the second $-\omega_2$. In one configuration resonators with $\omega_1$ and $\omega_2$ are interleaved and positioned on the opposite sides of the waveguide.

In the preferred embodiment the angular resonant frequencies are tunable. The tunability is achieved either by thermo-optical effect or by quantum confined Stark effect or by carrier injection. The resonant angular frequencies $\omega_1$ and $\omega_2$ may be tunable within a range of +/−0.1% within 10 microseconds. In one embodiment the resonant angular frequencies $\omega_1$ and $\omega_2$ are tunable slowly using thermo-optical effect followed by a fast tuning using carrier injection or Stark effect.

The resonators are coupled to the waveguide by directional couplers. In the preferred embodiment the directional couplers are tunable using MEMS.

For compactness the optical device can be integrated on silicon or glass or group III-V semiconductor substrate.

Yet another object of the present invention is a method of producing an optical signal delay, the method comprising introducing an input optical signal having multiple frequencies in a waveguide, coupling the optical signal to a first loop resonator; coupling a light beam outputted by the first resonator to a second loop resonator; outputting a delayed optical signal, wherein all frequencies of the input optical signal have the same group delay. In one embodiment the first and the second loop resonators have the resonant angular frequencies $\omega_1=\omega_0+\Delta\omega$ and $\omega_2=\omega_0-\Delta\omega$ respectively, where $\omega_0$ is a median frequency of the input optical signal.

b. resonance frequency shifted by ±13 GHz;

c. two combined shifted microresonators.

Figure 5:
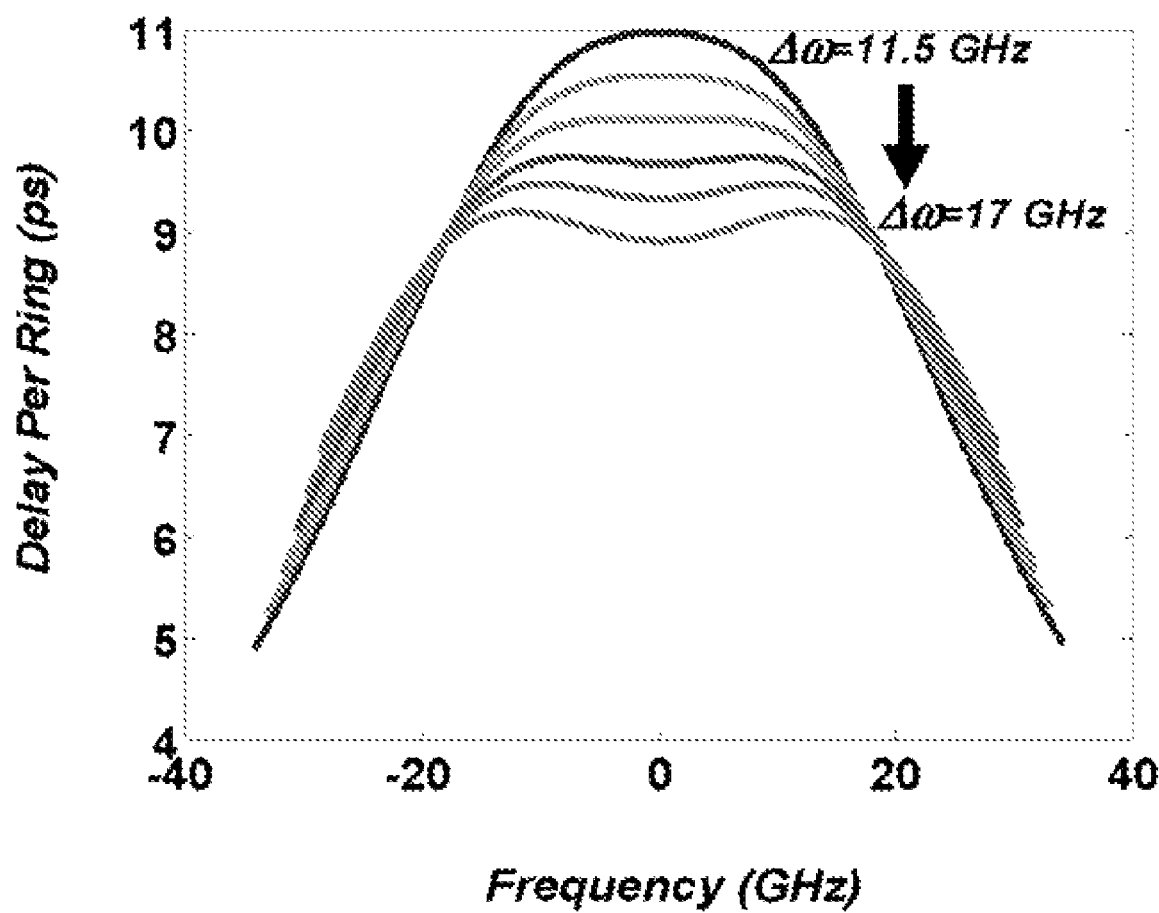

FIG. 5 Group delay spectra of "compensated shifted resonator" delay line for different amounts of detuning.

Figure 6:
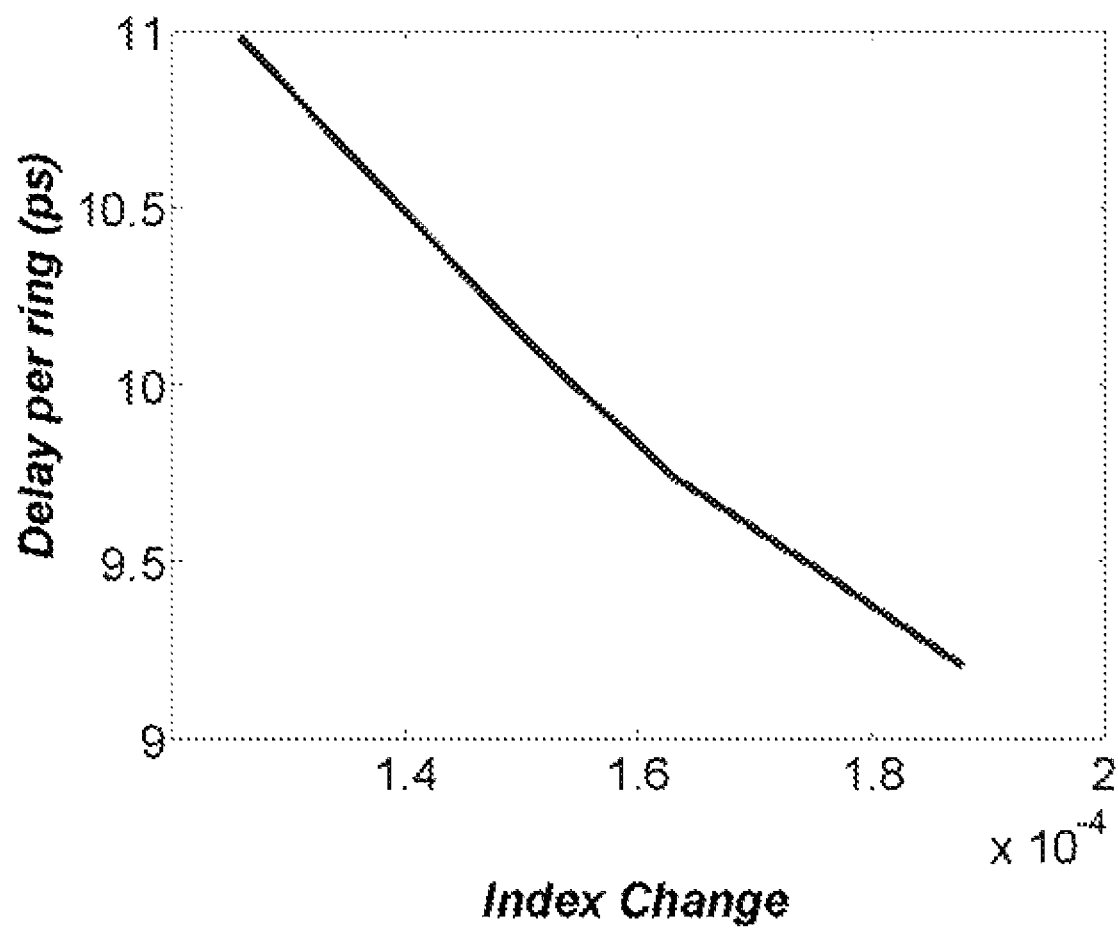

FIG. 6 A delay per ring as a function of index change.

Figure 7:
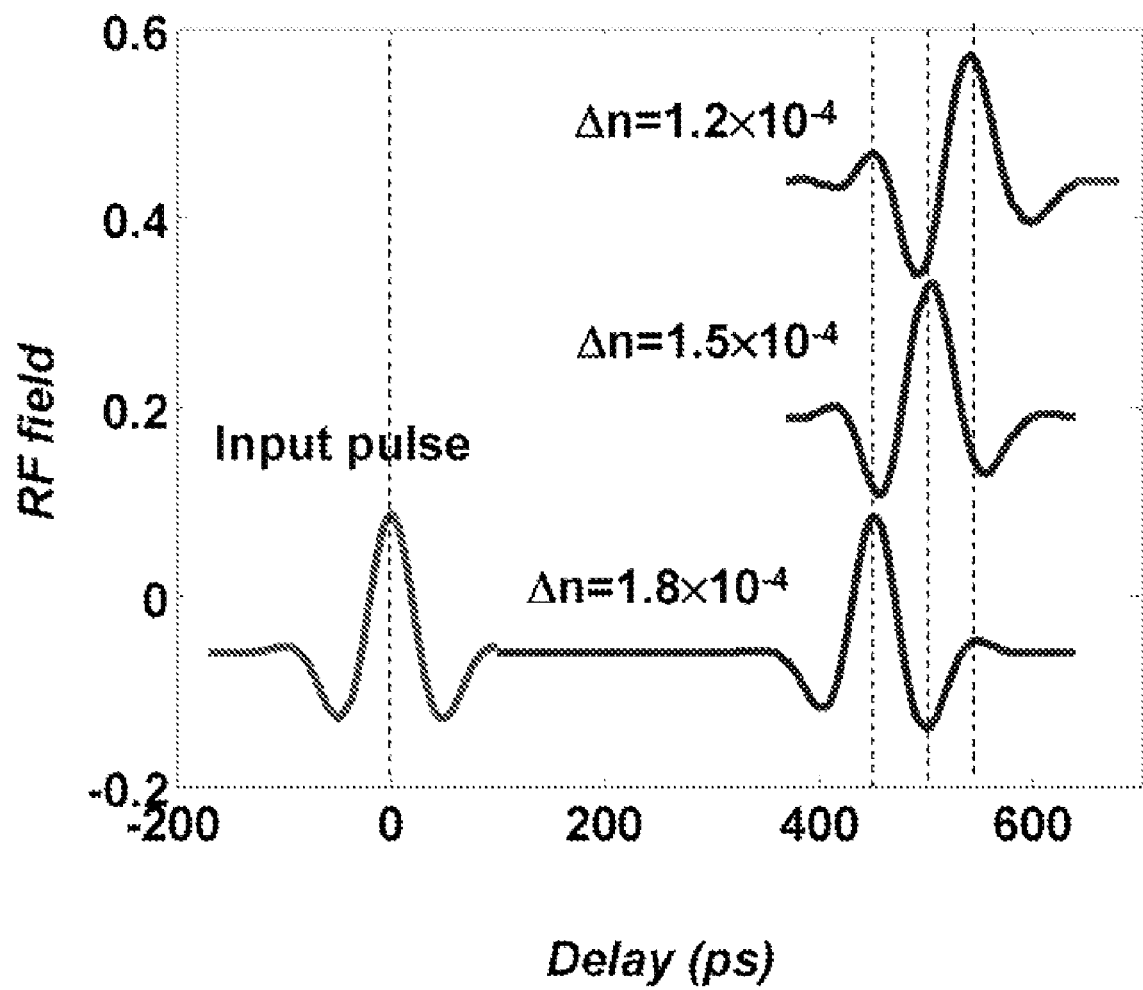

FIG. 7 A tunable delay of RF pulses using compensated shifted microresonator with 50 rings.

DETAILED DESCRIPTION OF THE PREFERRED EMBODIMENT

Optical delay lines typically use near infrared (NIR) light, however the disclosure is not limited to this spectral range. The term "optical" in the present disclosure comprises visible, near infrared, infrared, far infrared and the near and far ultra-violet spectra.

Figure 1:
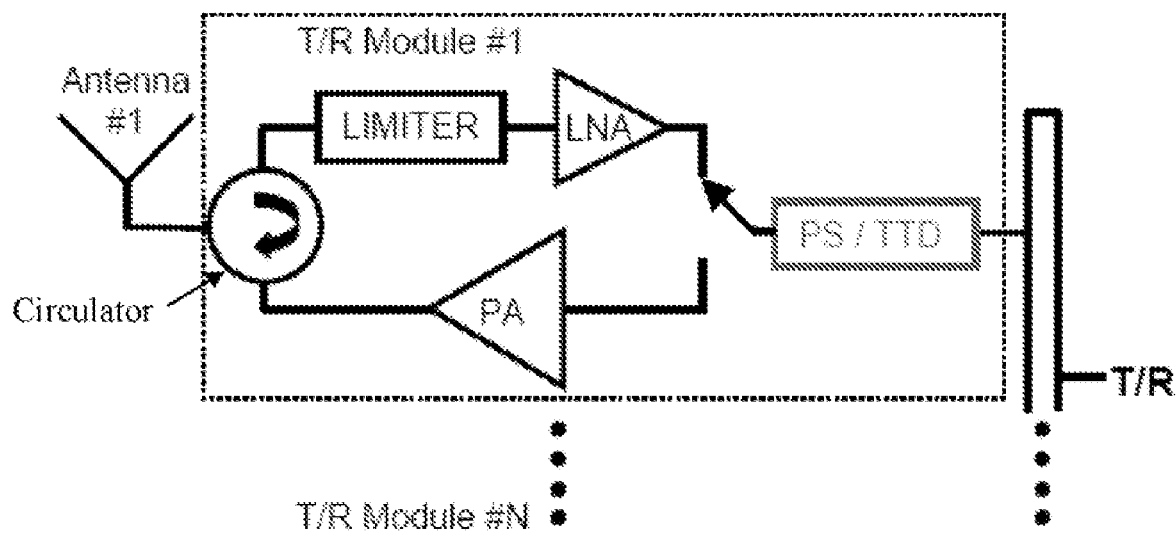
FIG. 1 A schematic of a transmitter/receiver module having an active phased array system with true time delay unit.
Figure 2:
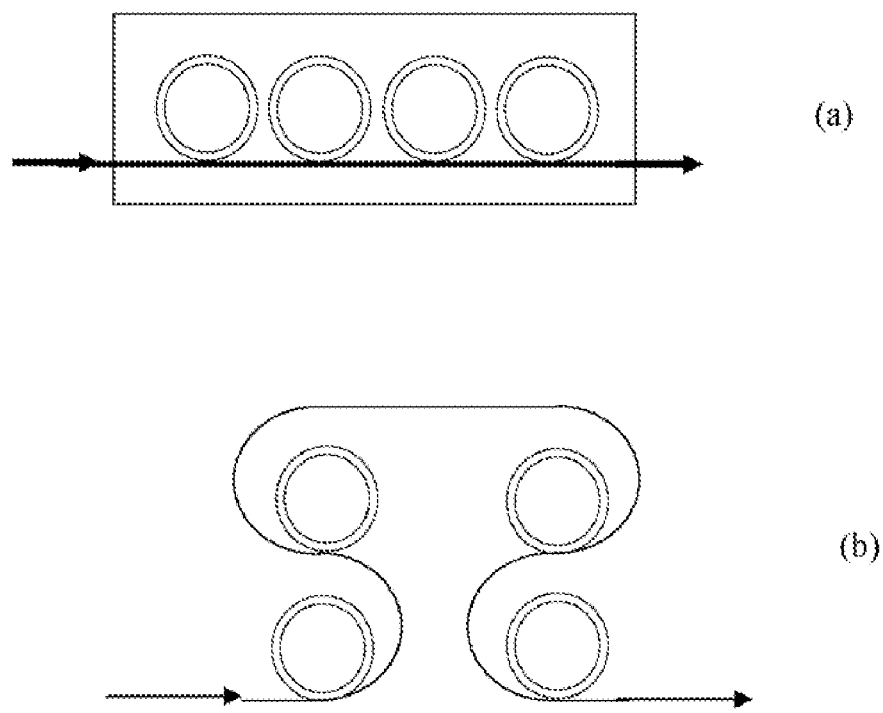
FIG. 2. (a) A 'side-coupled integrated spaced sequence of resonators' (SCISSOR) structure; (b) a SCISSOR structure with the resonators coupling on the opposite sides of the core waveguide (prior art).

The prior art shows that the phase shift in the SCISSOR delay line (shown in FIG. 2 (a)) with N rings each having a round-trip time $\tau$ can be written as $$\tan\left(\frac{\Phi}{N}\right) = \frac{\kappa^2 \sin(\omega - \omega_r)\tau}{(1+\rho^2)\cos(\omega-\omega_r)\tau - 2\rho} \quad (1)$$

where the resonant frequency is $\omega_r = 2m\pi\tau^{-1}$ and $\tau$ is around trip time, and the coupling between the resonator and waveguide is $\kappa = \sqrt{1-\rho^2}$ The group delay can then be written as $$T_d(\omega) = \frac{\partial \Phi(\omega)}{\partial \omega} = N\tau \frac{1+\rho}{1-\rho} - N\tau^3 \frac{(1+\rho)\rho}{(1-\rho)^3}(\omega-\omega_r)^2 + \quad (2)$$
$$\frac{1}{12}N\tau^5 \frac{(1+\rho)\rho(1+10\rho+\rho^2)}{(1-\rho)^5}(\omega-\omega_r)^4 + \ldots ==$$
$$T_{d0} - N\beta_3(\omega-\omega_r)^2 + N\beta_5(\omega-\omega_r)^4 + \ldots$$

where we have introduced higher order group delay dispersion (GDD) terms $\beta_3$ and $\beta_5$. It is these terms that are responsible for the different delay experienced by different frequency components of the signal.

By adjusting the phase of the received signal by means of tunable delays, the sensitivity, directional gain and other aspects of the RF antenna can be controllably varied.

The present invention addresses tunability and the bandwidth expansion of SCISSOR not achievable in the prior art design.

Figure 3:
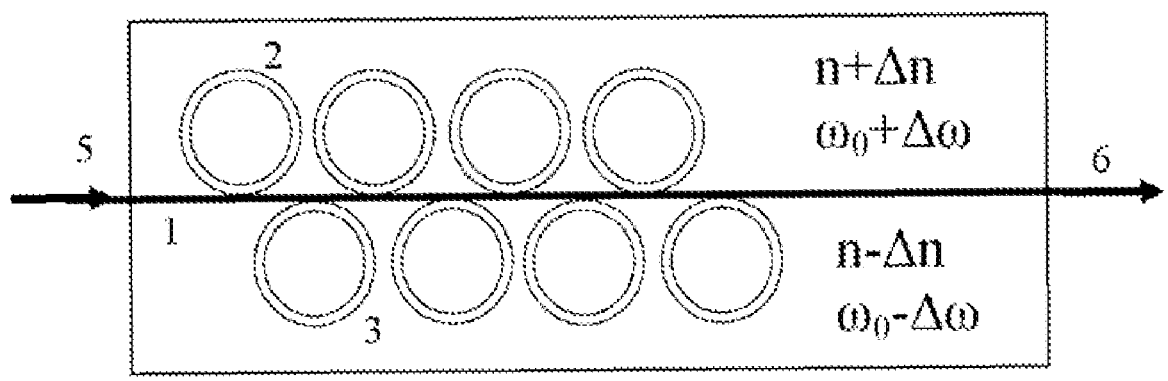
FIG. 3 A tunable delay based on two sets of microresonators.

The novel delay line structure is shown in FIG. 3, where the resonant frequencies of rings are shifted by a small amount $\Delta\omega$ relative to $\omega_0$ (central frequency of the signal) i.e. $\omega_{1,2}=\omega_0\pm\Delta\omega$ This can be accomplished by changing the effective refractive index on the two sides of the central bus. An input optical signal is introduced in the waveguide 1 and coupled in and out the first resonator 2 having an angular resonant frequency $\omega_1$. The output signal from the first resonator then coupled in and out of the second resonator 3 with an angular resonant frequency $\omega_2$. In the preferred embodiment the device has more than one pair of resonators with $\omega_1$ and $\omega_2$. One set of resonators (shown on one side of the waveguide) have angular resonant frequency $\omega_1$, while another set of resonators (shown on the opposite side of the waveguide) have angular resonant frequency $\omega_2$. Each set may contain tens of the resonators. When the input optical signal 5 is a complex signal having multiple frequency components, this device provides an equal group delay to all frequency components in the output signal 6. This is achieved by eliminating a third order group delay dispersion over all frequencies of the input optical signal using cancellation of a positive dispersion of the first loop resonator by a negative dispersion of equal magnitude of the second loop resonator.

The different resonant angular frequencies $\omega_1$ and $\omega_2$ may be achieved by different perimeters of the first and second resonators or by different effective refractive indices of the resonator waveguides. The resonator loop can be of any shape: ring, rectangular, etc.

Figure 4:
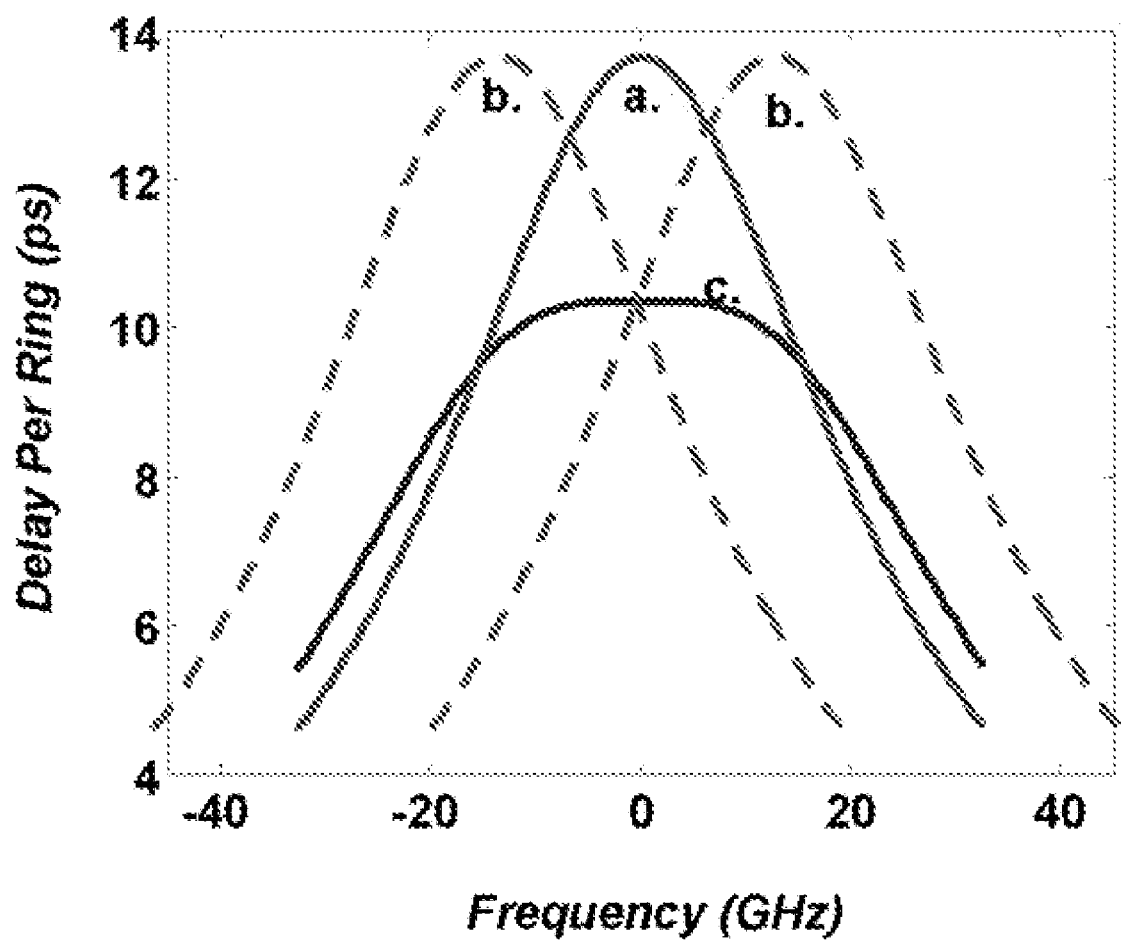
FIG. 4 Group delay spectra of the microresonators with a. given resonance frequency $\omega_0$.

FIG. 4 shows the spectra of $T_{d1}(\omega)$-group delay per one ring for the structure with identical rings (curve a), the two shifted spectra $T_{d1}(\omega \pm \Delta \omega)$ for the "upper and lower rings" drawn by dashed lines and the resulting average curve $T_{d1} = T_{d1}(\omega + \Delta \omega)/2 + T_{d1}(\omega - \Delta \omega)/2$ which appears significantly flattened. This flattened curve provides a wider bandwidth of operation than previous designs. As an example, we use the rings with round trip time $\tau = 0.22$ ps and $\kappa = 0.25$. The detuning $\Delta v = (2\pi)^{-1} \Delta \omega$ in FIG. 4 was taken to be 13 GHz. Changing $\Delta \omega$ will affect both magnitude of group delay and its spectral width, thus providing a way for tunability, but with certain bandwidth restrictions.

The analytical estimation of the system performance uses an expression for the group delay in the "shifted" SCISSOR with power series approach applied.

The expression for the group delay is the following $$T_d(\omega) = T_{d0} - \frac{N}{2} \beta_3^{(1)}(\omega - \omega_0 - \Delta \omega)^2 - \frac{N}{2} \beta_3^{(2)}(\omega - \omega_r + \Delta \omega)^2 + \quad (3)$$
$$\frac{N}{2} \beta_5^{(1)}(\omega - \omega_0 - \Delta \omega)^4 + \frac{N}{2} \beta_5^{(2)}(\omega - \omega_0 + \Delta \omega)^4 \ldots \approx \approx$$
$$T_{d0} - N\beta_3 \Delta \omega^2 + N\beta_5 \Delta \omega^4 - N[\beta_3 - 6\beta_5 \Delta \omega^2](\omega - \omega_r)^2 +$$
$$N[\beta_5 - 15\beta_7 \Delta \omega^2](\omega - \omega_0)^4$$

Now, if the condition $$\Delta \omega_0^2 = \frac{\beta_3}{6\beta_5} = \frac{2(1-\rho)^2}{(1+10\rho+\rho^2)}\tau^{-2} \approx \frac{(1-\rho)^2}{6}\tau^{-2} \quad (4)$$

is satisfied, the third order dispersion is eliminated, and a following expression is obtained for the delay time $$T_d(\omega_0) = T_{d0} - \frac{5}{6} N\beta_3 \Delta \omega_0^2 + N\beta_5'(\omega - \omega_r)^4 = \quad (5)$$
$$T_{d0} - \frac{5}{3} \frac{\rho}{1+10\rho+\rho^2} T_{d0} + N\beta_5'(\omega - \omega_r)^4 \approx$$
$$\frac{31}{36} T_{d0} + N\beta_5'(\omega - \omega_r)^4$$

which is only about 15% less than the delay in the simple SCISSOR. Note that the delay spectrum curve of FIG. 4.c becomes flattened.

The important result is the fact that by changing $\Delta \omega$ in the vicinity of $\Delta \omega_0$ one can achieve a tunable delay. By differentiating (3) with respect to detuning $\Delta \omega$ one obtains $$\left.\frac{dT_d}{d\Delta \omega}\right|_{\Delta \omega_0} = -2N\Delta \omega[\beta_3 - 2N\beta_5 \Delta \omega^2]_{\Delta \omega_o} = \quad (6)$$
$$-\frac{4}{3} N\beta_3 \Delta \omega_o = -\frac{4}{3\sqrt{6}} N\tau^2 \frac{(1+\rho)\rho}{(1-\rho)^2} = -\frac{4}{3\sqrt{6}} T_d \frac{\rho \tau}{1-\rho}$$

The expression for the resonant frequency change $\Delta \omega$ as a function of refractive index change $\Delta n$ that causes this change is the following $$\Delta \omega = f \omega_r \Delta n / n \quad (7)$$

Where f is the effective fraction of circumference in which the refractive index actually can get changed. Thus the time delay is $$\Delta T_d = -\frac{4}{3\sqrt{6}} T_d \frac{\rho f \omega_r \tau}{1-\rho} \frac{\Delta n}{n} = -\frac{8\pi}{3\sqrt{6}} \frac{\rho}{1-\rho} \frac{fL\Delta n}{\lambda_0} T_d \quad (8)$$

Changing refractive index by 0.1% changes the delay by 50%. FIG. 5 presents the result of numerical modeling of the same structure with $\kappa = 0.25$ and the detuning varying from 11.5 GHz to 17 GHz.

A tunability of about 2 ps per ring can be achieved as the shape of group delay spectra changes. In fact the "camelback spectra" achieved with larger detuning may be better for a double-sideband modulated signal than the flatter curve attained with optimum detuning. The value of maximum group delay as a function of index change (for the effective index of about 2.2) is shown in FIG. 6.

The results are consistent with the rough estimate obtained before—a reasonably small (less than $10^{-3}$) change in refractive index can accomplish fairly large fractional change in the delay time. Therefore, it appears that the main limitation is not the limited ability to change index but still the dispersion of group delay. Its impact can be estimated as follows:

FIG. 7 shows the evolution of a 100 ps pulse through the delay line of FIG. 3 consisting of N=50 rings for different values of the refractive index change. The results show that one can achieve delays of about 100 ps (from 450 to 550 ps) which is more that sufficient to achieve full 180 degrees rotation in a phased array antenna designed with a central frequency of 8.8 GHz. One can see that GDD plays an important role even in the compensated scheme but note that the total (fixed) delay exceeds the one in the un-compensated scheme by a factor of 5 or so.

A variety of technologies could be used for the tunable delay fabrication. In the preferred embodiment an active device is provided including a silicon substrate, an insulator layer, and a top silicon layer, in which the device is fabricated. The device is electronically controlled by injected carriers or by applying an electric field. For this, the loops are made from a semiconductor, such as Si with lower layer being n-doped, upper layer p-doped and the layer in between undoped. When a forward bias (+ to the top layer) is applied, carriers (electrons and holes) are injected into the undoped region and they increase the effective refractive index of the material, causing the change of the angular resonant frequency.

In another embodiment the resonator angular frequency is tuned using the quantum confined Stark effect. For this, the loops are made from direct-bandgap semiconductor quantum wells, such as GaAs, with the lower layer being n-doped, the upper layer p-doped and the layer in between undoped. When a reverse bias (to the top layer) is applied, the applied field increases the effective refractive index, causing a change of the angular resonant frequency.

The resonant angular frequencies $\omega_1$ and $\omega_2$ may be tunable within a range of +/−0.1% within 10 microseconds using these technologies.

In a different embodiment another (slower) technology is used, which includes silica waveguides on a silicon wafer. These devices use thermal tuning by applying a heater on the resonator or waveguide structure to change the refractive index. "Hydex" material, produced by Infinera, CA can be used for this kind of thermally tuned device; this material has a refractive index between that of silicon and silica. Devices could also be fabricated in III-V compound semiconductors, such as InP or GaAs.

It is another object of the present invention to provide a method for producing an optical signal delay. The method comprises introducing an input optical signal having multiple frequencies in a waveguide, coupling the optical signal to a first loop resonator; then coupling the optical signal outputted by the first resonator to a second loop resonator; outputting a delayed optical signal, wherein all frequencies of the input optical signal have the same group delay. The first and the second loop resonator have different angular resonant frequencies as shown in FIG. 3. These resonant angular frequencies $\omega_1$ and $\omega_2$ may be tuned by the same value $\Delta\omega$ thus tuning the group delay of the output optical signal.

In the preferred embodiment of the present invention, a series of ring resonators is used in the device design. However, the invention is not limited to such configuration. Other embodiments include all variety of resonator types. The invention addresses an assembly of one or more pairs of tunable resonators or filters (or just responses), which when combined together provide the required overall tuning response, that is, a broad range of tunability of the overall group delay (time delay) with limited distortion. The resonators/filters are tuned in opposite directions (in wavelength) so that the combined group delay at the center wavelength between the two resonators/filters is tuned up or down as the responses move away from or towards each other. This approach is applicable to any types of resonators or filters than can be combined (amplitude and phase responses) to give the desired response, which includes micro-ring resonators, Bragg gratings, photonic crystals, free space resonators or some other form of optical resonator or filter of some sort. The device does not need to be flat, and it can also be in 3D—some resonators are spherical, and any kind of 2D or 3D structure could potentially be used. The refractive index is changed in one implementation, but it is also possible to change the coupling coefficient to tune the rings through a physical mechanical movement using MEMS. In another embodiment, the refractive index is kept unchanged while the device is tuned by changing its size.

While the above invention has been described with reference to specific embodiments, these embodiments are intended to be illustrative and not restrictive. The scope of the invention is indicated by the claims below, and all changes that come within the meaning and range of equivalents thereof are intended to be embraced therein.

What is claimed is:

1. An optical device for producing a tunable time delay of an input optical signal, comprising:
   an optical waveguide receiving the input optical signal;
   at least a first loop waveguide resonator coupled to the waveguide by a first coupler, the input signal being coupled in and out of the first loop resonator;
   at least a second loop waveguide resonator being coupled to the waveguide by a second coupler; the second loop resonator receiving a signal outputted by the first loop resonator and outputting an output signal;
   the output signal being transmitted by the waveguide;
   wherein the first and the second loop resonators having different resonant angular frequencies $\omega_1$ and $\omega_2$, wherein the input optical signal being a complex signal having multiple frequency components, and the device is providing an equal group delay to all frequency components in the output signal.

2. The optical device of claim 1, wherein the group delay up to 100 ps.

3. The optical device of claim 2, wherein the group delay up to 1000 ps.

4. The optical device of claim 1, further comprising the different resonant angular frequencies $\omega_1$ and $\omega_2$ achieved by having different perimeters of the first and second resonators or by different effective refractive indices of the resonator waveguides.

5. The optical device of claim 1, further comprising:
   the resonant angular frequencies $\omega_1=\omega_0+\Delta\omega$ and $\omega_2=\omega_0-\Delta\omega$ of the loop resonators being equally distant from a frequency $\omega_0$, wherein $\omega_0$ is an input signal median frequency.

6. The optical device of claim 1, wherein the resonant angular frequencies $\omega_1$ and $\omega_2$ are tunable.

7. The optical device of claim 6, wherein the input optical signal being a complex signal having multiple frequency components, and the device is providing an equal tunable group delay to all frequency components in the output signal.

8. The optical device of claim 6, wherein the resonant angular frequencies $\omega_1$ and $\omega_2$ are tunable using thermo-optical effect.

9. The optical device of claim 6, wherein the resonant angular frequencies $\omega_1$ and $\omega_2$ are tunable using carrier injection.

10. The optical device of claim 6, wherein the resonant angular frequencies $\omega_1$ and $\omega_2$ are tunable using quantum confined Stark effect.

11. The optical device of claim 6, wherein the resonant angular frequencies $\omega_1$ and $\omega_2$ are tunable slowly using thermo-optical effect followed by a fast tuning using carrier injection or Stark effect.

12. The optical device of claim 6, wherein the resonant angular frequencies $\omega_1$ and $\omega_2$ are tunable within a range of +/−0.1% within 10 microsecond.

13. The optical device of claim 6, wherein coupling rates of first and the second coupler are tunable.

14. The optical device of claim 13, wherein the coupling rates are tunable using MEMS.

15. The optical device of claim 1, wherein each of the resonators are ring resonators having a radius ranging from about 2 µm to about 50 µm.

16. The optical device of claim 1, wherein the first and the second loop resonators are positioned on the opposite sides of the waveguide.

17. The optical device of claim 1, wherein the device is integrated on silicon or glass or group III-V semiconductor substrate.

18. The optical device of claim 1, further comprising a first set of resonators having at least twenty resonators and a second set of resonators having at least twenty resonators; each resonator of the first and the second sets of resonators being coupled to the waveguide; the first and the second set of resonators having resonant angular frequencies $\omega_1$ and $\omega_2$ respectively; all resonators being coupled to the waveguide.

19. A method of producing an optical signal delay, the method comprising:
   introducing an input optical signal in a waveguide, the optical signal having multiple frequencies;
   coupling the optical signal to a first loop resonator;
   coupling a light beam outputted by the first resonator to a second loop resonator;
   outputting a delayed optical signal, wherein all frequencies of the input optical signal have the same group delay.

20. The method of producing an optical signal delay of claim 19, wherein:

the first and the second loop resonators having the resonant angular frequencies $\omega_1$ and $\omega_2$ respectively.

21. The method of producing an optical signal delay of claim 19, further comprising: tuning the resonant angular frequencies $\omega_1$ and $\omega_2$ by the same value resulting in tuning the group delay of the delayed optical signal.

22. The method of producing an optical signal delay of claim 19, wherein:

the resonant angular frequencies $\omega_1=\omega_0+\Delta\omega$ and $\omega_2=\omega_0-\Delta\omega$ of the loop resonators being equally distant from the frequency $\omega_0$, and the input signal having a median frequency $f_0$.

23. The method of producing an optical signal delay of claim 19, further comprising: eliminating a third order group delay dispersion over all frequencies of the input optical signal achieved using cancellation of a positive dispersion of the first loop resonator by a negative dispersion of equal magnitude of the second loop resonator.

* * * * *